(12) United States Patent
Eller et al.

(10) Patent No.: US 11,705,601 B2
(45) Date of Patent: Jul. 18, 2023

(54) STRUCTURAL BATTERY FOR AN AIRCRAFT VEHICLE

(71) Applicant: Lockheed Martin Corporation, Bethesda, MD (US)

(72) Inventors: Michael R. Eller, New Orleans, LA (US); Roger A. Brewer, Weatherford, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 52 days.

(21) Appl. No.: 17/405,234

(22) Filed: Aug. 18, 2021

(65) Prior Publication Data

US 2023/0054434 A1      Feb. 23, 2023

(51) Int. Cl.
*H01M 50/249* (2021.01)
*B64D 27/24* (2006.01)
(Continued)

(52) U.S. Cl.
CPC .......... *H01M 50/249* (2021.01); *B64D 27/24* (2013.01); *H01M 12/02* (2013.01);
(Continued)

(58) Field of Classification Search
None
See application file for complete search history.

(56) References Cited

U.S. PATENT DOCUMENTS 3,937,424 A    2/1976  Meier et al.
4,693,946 A *  9/1987  Niksa ................. H01M 12/065
                                                      429/405

(Continued)

FOREIGN PATENT DOCUMENTS

CN     1 538 545 A    10/2004
CN   102 088 101 A     6/2011
(Continued)

OTHER PUBLICATIONS

EPO Communication re Pat. Appln. 22188714.4-1108, extended European Search Report, dated Feb. 17, 2023.

*Primary Examiner* — Gregg Cantelmo
(74) *Attorney, Agent, or Firm* — Baker Botts L.L.P.

(57) ABSTRACT

A lightweight structure for a vehicle, in particular an aircraft, comprises a longitudinal member with a base web, which has a first busbar on a contact surface, and a cross member with a central web and a cross web extending transversely to the central web, the cross web being a first connecting conductor which extends in the area of a first end section of the cross member on a first surface and a second surface of the cross web oriented opposite to this, and a second connection conductor track which extends separately from the first connection conductor track at least on the first surface of the cross web. The cross member extends transversely to the longitudinal member and the cross member is connected at the first end section to the base member in such a way that the first connection conductor track is in contact with the first busbar of the base member. The lightweight structure also includes a flat carbon fiber structure battery connected to the central web of the cross member, a first collector of the carbon fiber structure battery being electrically connected to the first or the second connection conductor track and a second collector of the carbon fiber structure battery being electrically connected to the respective other connection conductor track.

20 Claims, 6 Drawing Sheets

(51) Int. Cl.
*H01M 50/107* (2021.01)
*H01M 50/103* (2021.01)
*H01M 12/02* (2006.01)
*H01M 50/673* (2021.01)
*H01M 50/609* (2021.01)
*H01M 50/691* (2021.01)

(52) U.S. Cl.
CPC ....... *H01M 50/103* (2021.01); *H01M 50/107* (2021.01); *H01M 50/609* (2021.01); *H01M 50/673* (2021.01); *H01M 50/691* (2021.01); *B64D 2221/00* (2013.01); *H01M 2220/20* (2013.01)

(56) References Cited

U.S. PATENT DOCUMENTS

| | | | |
|---|---|---|---|
| 5,318,861 A | 6/1994 | Harats et al. | |
| 8,967,529 B1 | 3/2015 | Bennett | |
| 9,520,580 B2 | 12/2016 | Sayre et al. | |
| 10,046,666 B2 | 8/2018 | Wei et al. | |
| 10,559,792 B1 | 2/2020 | Combs | |
| 2004/0175603 A1* | 9/2004 | Yang | H01M 12/065 |
| | | | 429/82 |
| 2004/0211862 A1 | 10/2004 | Elam | |
| 2019/0092488 A1 | 3/2019 | Veto | |
| 2019/0252655 A1 | 8/2019 | Zimmermann | |
| 2019/0341592 A1 | 11/2019 | Linde et al. | |
| 2020/0277062 A1 | 9/2020 | Becker et al. | |
| 2020/0391843 A1 | 12/2020 | Bernhardt | |

FOREIGN PATENT DOCUMENTS

| | | |
|---|---|---|
| CN | 209023127 U | 6/2019 |
| CN | 111252256 | 6/2020 |
| CN | 211996172 U | 11/2020 |
| DE | 10 2019 218979 A1 | 6/2021 |
| EP | 1736406 A1 | 12/2006 |
| EP | 3 459 842 A1 | 3/2019 |
| JP | 2017 109553 A | 6/2017 |

\* cited by examiner

STRUCTURAL BATTERY FOR AN AIRCRAFT VEHICLE

TECHNICAL FIELD

This disclosure generally relates to batteries, and more specifically to a structural battery for an aircraft vehicle.

BACKGROUND

Traditionally, internal combustion engines have been used to power aircraft. Batteries can present a lower initial cost, less maintenance, and lower system mass if used to power aircraft. However, electric aircraft are limited by a reduced payload capacity, shorter flight range, and lower endurance. Additionally, significant mass is added when a large number of batteries is used to power the motors of the aircraft.

BRIEF DESCRIPTION OF THE DRAWINGS

To assist in understanding the present disclosure, reference is now made to the following description taken in conjunction with the accompanying drawings, in which.

DETAILED DESCRIPTION

To facilitate a better understanding of the present disclosure, the following examples of certain embodiments are given. The following examples are not to be read to limit or define the scope of the disclosure. Embodiments of the present disclosure and its advantages are best understood by referring to FIGS. 1 through 5B, where like numbers are used to indicate like and corresponding parts. Described herein are various systems and methods that provide utilization of one or more batteries to power and structurally support an aircraft.

Figure 1:
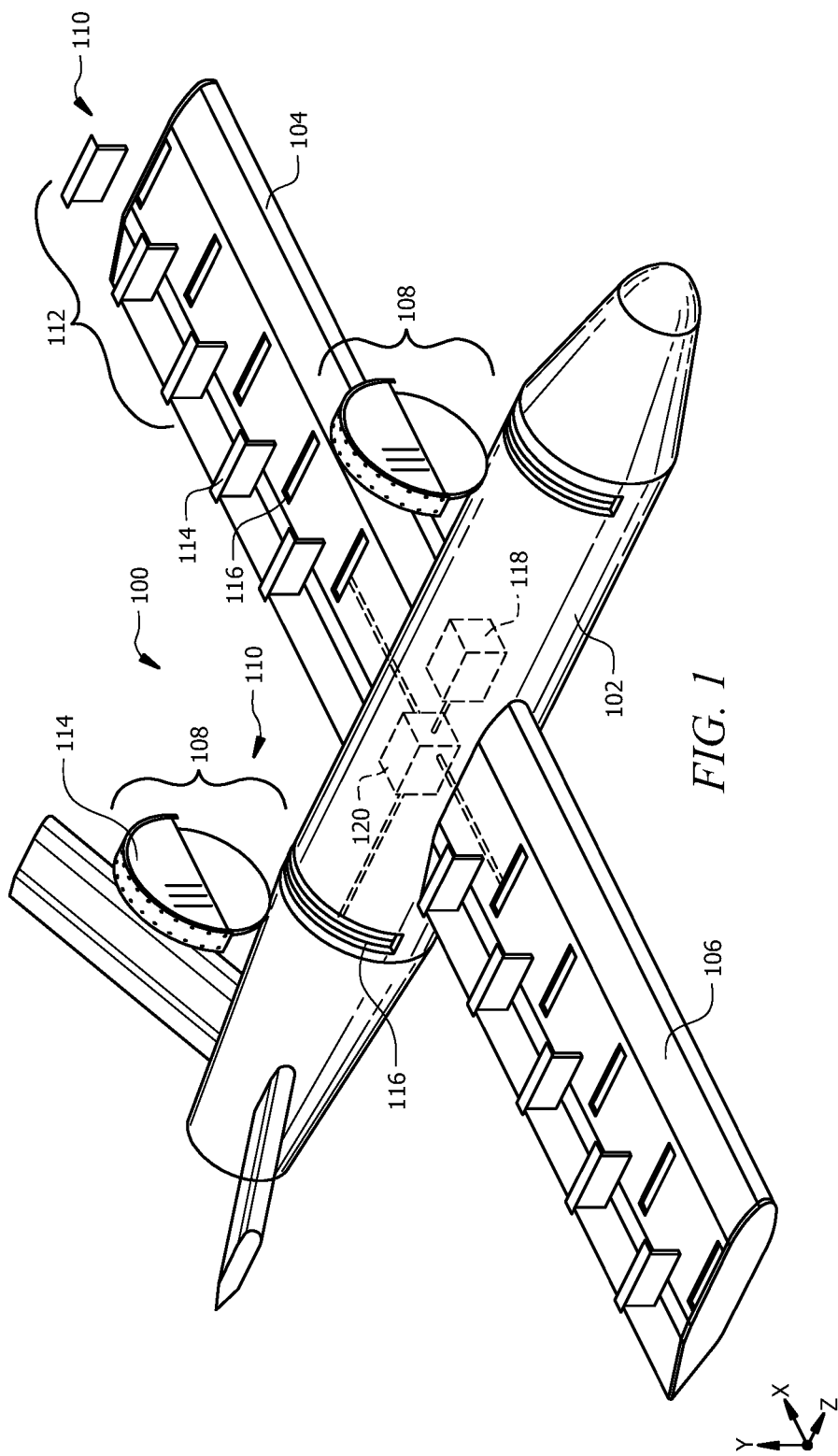
FIG. 1 illustrates an example vehicle, according to certain embodiments.

FIG. 1 illustrates an example vehicle 100. Vehicle 100 may be any suitable vessel configured for transportation, such as an aircraft. Vehicle 100 may include a body 102 (for example, a fuselage), a first wing 104, and a second wing 106. As illustrated, both the first wing 104 and the second wing 106 may be coupled to the body 102, wherein the first wing 104 may be disposed opposite to the second wing 106. The vehicle 100 may be any suitable size, height, shape, and any combinations thereof. In embodiments, the body 102 may be cylindrical, and the first wing 104 and the second wing 106 may generally be rectangular. As shown, the vehicle 100 may comprise a first grouping 108 of one or more batteries 110 and a second grouping 112 of one or more batteries 110.

The one or more batteries 110 may be operable to provide power to operate the vehicle 100 and to provide structural support for the vehicle 100. The first grouping 108 of one or more batteries 110 may be disposed along the body 102, and the second grouping 112 of one or more batteries 110 may be disposed along the first wing 104 and the second wing 106. The one or more batteries 110 may be any suitable size, height, shape, and any combinations thereof. With reference to FIG. 1, the shape of the one or more batteries 110 of the first grouping 108 may be different from that of the one or more batteries 110 of the second grouping 112. For example, the one or more batteries 110 of the first grouping 108 may be generally in a circular shape to match the cross-section of the body 102. Further, the one or more batteries 110 of the second grouping 112 may be generally in a rectangular shape to accommodate the cross-section of the first wing 104 and the second wing 106. Each of the one or more batteries 110 may comprise a top portion 114 and a bottom portion 116, wherein the bottom portion 116 is disposed either in the body 102, first wing 104, or the second wing 106 and operable to receive the top portion 114. During operations, the top portion 114 may be interchangeable with another top portion 114. In embodiments, the one or more batteries 110 may comprise any suitable materials, including, but not limited to, metals, nonmetals, polymers, ceramics, composites, and any combinations thereof.

As illustrated, the vehicle 110 may further comprise a reservoir 118 and a pump 120. The reservoir 118 and the pump 120 may be disposed about any suitable location within the vehicle 100, such as within the body 102. The reservoir 118 may be operable to contain a volume of a substance, such as an electrolyte, to be used by the one or more batteries 110. Without limitations, the electrolyte may be a gel, solid, liquid, and any combinations thereof. In embodiments wherein the electrolyte is a gel or solid, the need for circulating liquid electrolyte may not be required. The pump 120 may be coupled to the reservoir 118 and the one or more batteries 110 and may be operable to direct a flow of the electrolyte to and/or from the one or more batteries 110.

While the example of vehicle 100 will be used throughout this disclosure as an example application of the methods and systems described herein, any suitable apparatus or structure onto which the one or more batteries 110 may be incorporated into is also contemplated in this disclosure. For example, vehicle 100 may be any type of vehicle, including an aircraft, a landcraft, a watercraft, a train, a hovercraft, and a helicopter.

Figure 2:
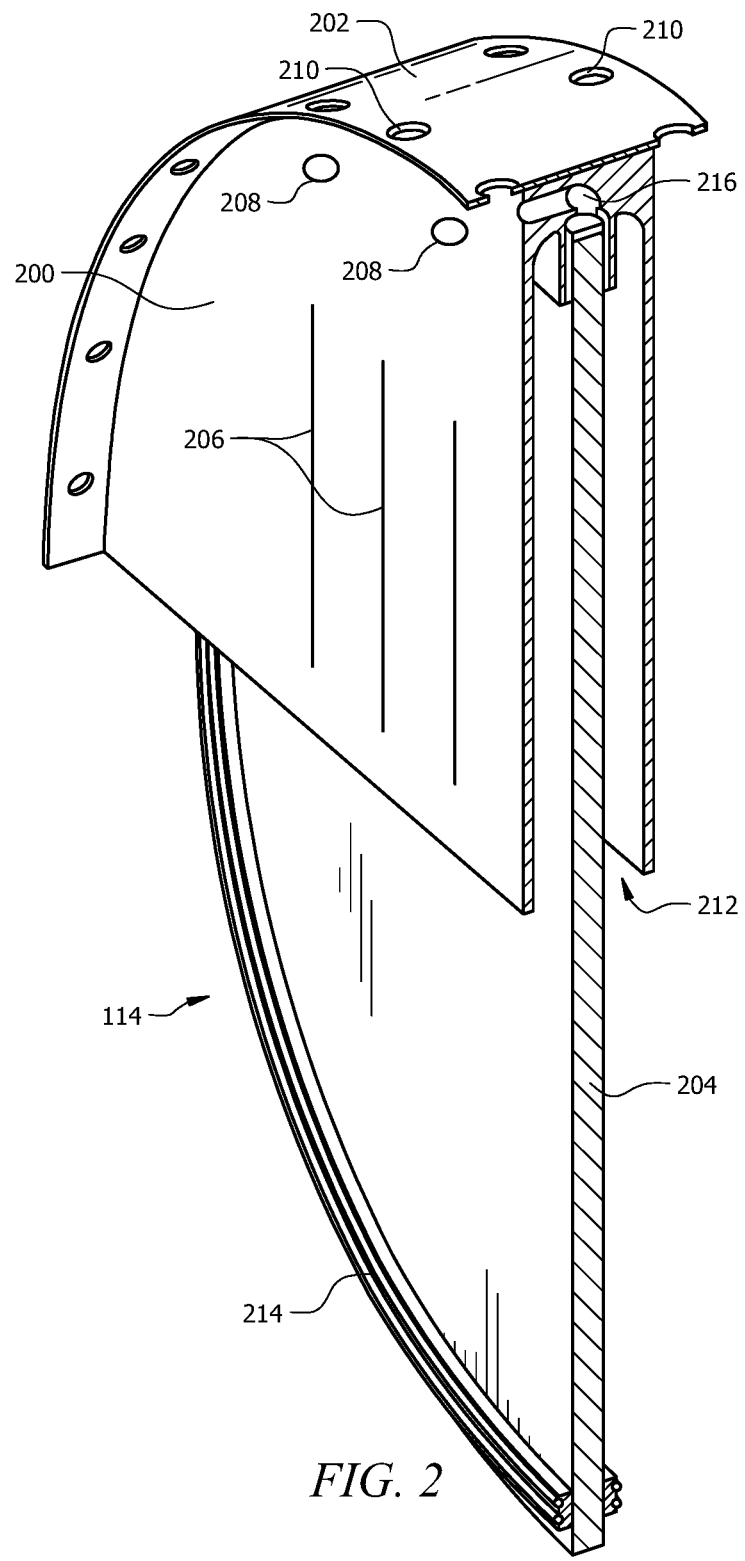
FIG. 2 illustrates an example top portion of a battery, according to certain embodiments.

FIG. 2 illustrates a cross-sectional view of an example top portion 114 of one of the one or more batteries 110 (referring to FIG. 1) of the first grouping 108 (referring to FIG. 1). In embodiments, the top portion 114 may comprise a first half of a housing 200, a surface cover 202, and an anode 204. The first half of the housing 200 may be any suitable size, height, shape, and any combinations thereof. As illustrated, the first half of the housing 200 may be semicircular for the first grouping 108. In embodiments, the first half of the housing 200 may comprise any suitable materials, including, but not limited to, metals, nonmetals, polymers, ceramics, composites, and any combinations thereof. Without limitations, the first half of the housing 200 may comprise carbon fiber composite material that is electrically isolated from the anode 204 and is configured to support structural load of the vehicle 100 (referring to FIG. 1) in addition to the anode 204. The first half of the housing 200 may comprise one or more air vents 206 disposed about any suitable location on the first half of the housing 200. The one or more air vents 206 may be any suitable size, height, shape, and any combinations thereof. As shown, the one or more air vents 206 may be arranged as parallel, vertical lines on the first half of the housing 200. The one or more air vents 206 may be disposed randomly, uniformly, or in a pattern along the first half of the housing 200. As disclosed herein, the one or more air vents 206 may be open apertures that comprise any suitable shape. The one or more air vents 206 may be operable to allow for a flow of air to flow through the first half of the housing 200.

The first half of the housing 200 may further comprise electrical leads 208 disposed above the one or more air vents 206. In other embodiments, the electrical leads 208 may be disposed at a different location on the first half of the housing 200. Without limitations, the electrical leads 208 may be any suitable cabling, wiring, connection, and combinations thereof capable of electrically coupling the one of the one or more batteries 110 to an external component (for example, to another battery 110).

As illustrated, the surface cover 202 may be disposed on top of and/or around the first half of the housing 200. The surface cover 202 may be disposed about the circumference of the first half of the housing 200 and may extend in a perpendicular direction from the circumference of the first half of the housing 200. The surface cover 202 may be operable to couple the top portion 114 of the battery 110 to the vehicle 100 (for example, to the body 102, first wing 104, or the second wing 106). The surface cover 202 may comprise a plurality of holes 210 operable to be utilized in fastening the top portion 114 to the vehicle 100. Any suitable fasteners may be utilized through the plurality of holes 210 to couple the top portion 114 to the vehicle 100.

The anode 204 may be coupled to the first half of the housing 200 and may be at least partially disposed within the first half of the housing 200. The anode 204 may further extend from the first half of the housing 200. The anode 204 may be any suitable size, height, shape, and any combinations thereof. As illustrated, the anode 204 may be circular. In embodiments for the second grouping 112 (referring to FIG. 1), the anode 204 may be rectangular. In embodiments, the anode 204 may comprise any suitable materials, including, but not limited to, metals, nonmetals, polymers, ceramics, composites, and any combinations thereof. Without limitations, the anode 204 may comprise aluminum, an aluminum alloy, magnesium, a magnesium alloy, carbon fiber composites, and any combinations thereof. The anode 204 may be configured to support a structural load for the vehicle 100 during production of an electrical charge through corrosion of the anode 204. As illustrated, there may be a gap 212 disposed between the anode 204 and each side of the first half of the housing 200. The gap 212 may be operable to receive a pair of cathodes (for example, pair of cathodes 302 in FIG. 3) and may contain a suitable electrolyte that has been introduced into the battery 110 once the top portion 114 has coupled to the bottom portion 116 (referring to FIG. 1). There may be a seal 214 disposed on each side of the anode 204 operable to seal each respective side of the anode 204 to one of the pair of cathodes once the top portion 114 has coupled to the bottom portion 116. The first half of the housing 200 may further comprise a fluid port 216 coupled to the first half of the housing 200 and operable to direct a flow of an electrolyte into the gap 212 between the anode 204 and each one of the pair of cathodes. In embodiments, the fluid port 216 may be disposed within the first half of the housing 200 above the anode 204. The fluid port 216 may be fluidly coupled to the pump 120 (referring to FIG. 1), wherein the pump 120 may direct a flow of electrolyte from the reservoir 118 (referring to FIG. 1) to the top portion 114 of one of the one or more batteries 110 through the fluid port 216.

Figure 3:
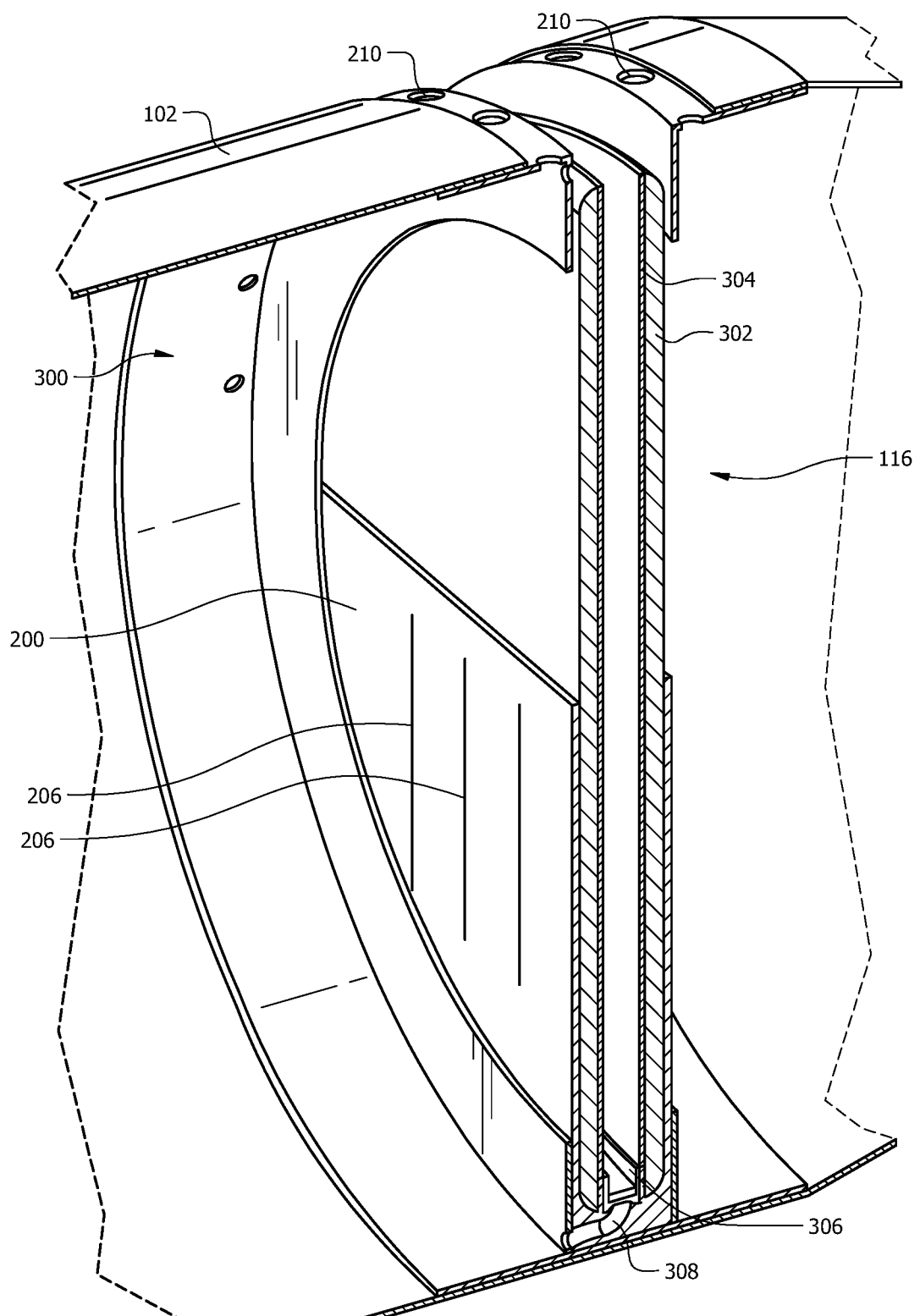
FIG. 3 illustrates an example bottom portion of a battery, according to certain embodiments.

FIG. 3 illustrates a cross-sectional view of an example bottom portion 116 of one of the one or more batteries 110 (referring to FIG. 1) of the first grouping 108 (referring to FIG. 1). In embodiments, the bottom portion 116 may comprise a second half of the housing 200, a flanged cover 300, a pair of cathodes 302, an ion exchange membrane separator 304, and a drain pan 306. In embodiment, the second half of the housing 200 may be similar to the first half of the housing 200. The second half of the housing 200 may be any suitable size, height, shape, and any combinations thereof. As illustrated, the second half of the housing 200 may be semicircular for the first grouping 108. In embodiments, the second half of the housing 200 may comprise any suitable materials, including, but not limited to, metals, nonmetals, polymers, ceramics, composites, and any combinations thereof. The second half of the housing 200 may comprise the one or more air vents 206 disposed about any suitable location on the second half of the housing 200. As shown, the one or more air vents 206 of the second half of the housing 200 may be arranged so as to mirror the configuration on the first half of the housing 200. The one or more air vents 206 may be operable to allow for a flow of air to flow through the second half of the housing 200.

As illustrated, the flanged cover 300 may be disposed on top of and/or around the second half of the housing 200. The flanged cover 300 may be disposed about the circumference of the second half of the housing 200. A portion of the flanged cover 300 may extend in a perpendicular direction from the circumference of the second half of the housing 200. The flanged cover 300 may be operable to couple the bottom portion 116 of the battery 110 to the body 102 of the vehicle 100 (referring to FIG. 1). Similar to the surface cover 202 (referring to FIG. 2), the flanged cover 300 may comprise the plurality of holes 210 operable to be utilized in fastening the bottom portion 116 to the vehicle 100. Any suitable fasteners may be utilized through the plurality of holes 210 to couple the bottom portion 116 to the vehicle 100. In embodiments, the surface cover 202 may be disposed about the flanged cover 300, and the plurality of holes 210 of the surface cover 202 may align with the plurality of holes 210 of the flanged cover 300.

The pair of cathodes 302 may be coupled to the second half of the housing 200 and may be at least partially disposed within the second half of the housing 200. The pair of cathodes 302 may further extend from the second half of the housing 200. The pair of cathodes 302 may be any suitable size, height, shape, and any combinations thereof. As illustrated, the pair of cathodes 302 may be circular. In embodiments for the second grouping 112 (referring to FIG. 1), the pair of cathodes 302 may be rectangular. In embodiments, the pair of cathodes 302 may comprise any suitable materials, including, but not limited to, metals, nonmetals, polymers, ceramics, composites, and any combinations thereof. Without limitations, the pair of cathodes 302 may comprise porous nickel foam, nickel mesh, carbon foam, carbon mesh, graphite foam, graphite mesh, and any combinations thereof. In one or more embodiments, a coating may be applied to each one of the pair of cathodes 302. Without limitations, the pair of cathodes 302 may be coated with graphene, manganese dioxide ($MgO_2$), platinum on carbon (PtC), silver manganate nanoplates, and any combination thereof. As illustrated, the ion exchange membrane separator 304 may be disposed on an internal side of each one of the pair of cathodes 302. The ion exchange membrane separator 304 may comprise the same size, height, shape, or dimensions as each one of the pair of cathodes 302. For example, the ion exchange membrane separator 304 may generally comprise a circular shape. The ion exchange membrane separator 304 may be configured to protect each cathode 302 from electrolyte saturation.

The second half of the housing 200 may further comprise the drain pan 306 disposed at the bottom of the second half of the housing 200 and operable to collect electrolyte, debris, and combinations thereof. In embodiments, a drain port 308 may be coupled to the drain pan 306 and disposed about a bottom surface of the drain pan 306. The drain port 308 may be fluidly coupled to the pump 120 (referring to FIG. 1) and may be operable to direct a flow of electrolyte, debris, and combinations thereof out of the battery 110 and to the pump 120.

Figure 4:
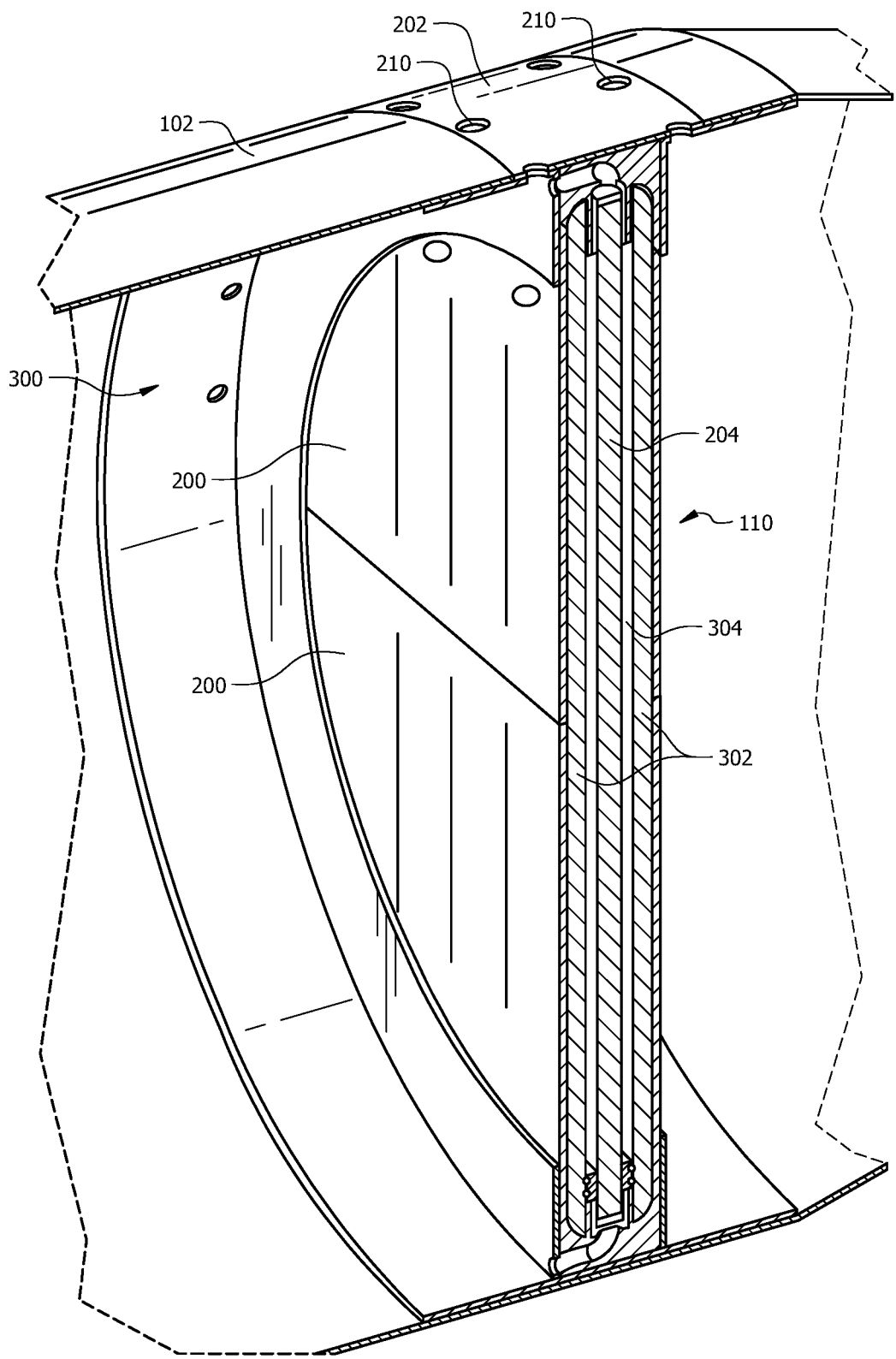
FIG. 4 illustrates an example battery, according to certain embodiments.

FIG. 4 illustrates a cross-sectional view of an example one of the one or more batteries 110 of the first grouping 108 (referring to FIG. 1). As illustrated, the surface cover 202 may be aligned with and disposed flush to the body 102 of the vehicle 100 (referring to FIG. 1). The flanged cover 300 may be disposed against an internal surface of the body 102. Both the surface cover 202 and the flanged cover 300 may be configured to align their respective plurality of holes 210. In embodiments, the fasteners may be used, via the plurality of holes 210, to assemble and secure the one of the batteries 110 to the vehicle 100. As shown, the first half of the housing 200 may be disposed against and abut the second half of the housing 200. The first half and second half of the housing 200 may collectively form a circular shape, similar to the shape and/or dimensions of the anode 204 and the pair of cathodes 302. The anode 204 may be disposed between the pair of cathodes 302. As the ion exchange membrane separator 304 is disposed on an internal side of each one of the pair of cathodes 302, the anode 204 may be sealed against each ion exchange membrane separator 304. In embodiments, an electrolyte may be introduced into the battery 110 and may be contained between the anode 204 and the ion exchange membrane separators 304.

Figure 5A:
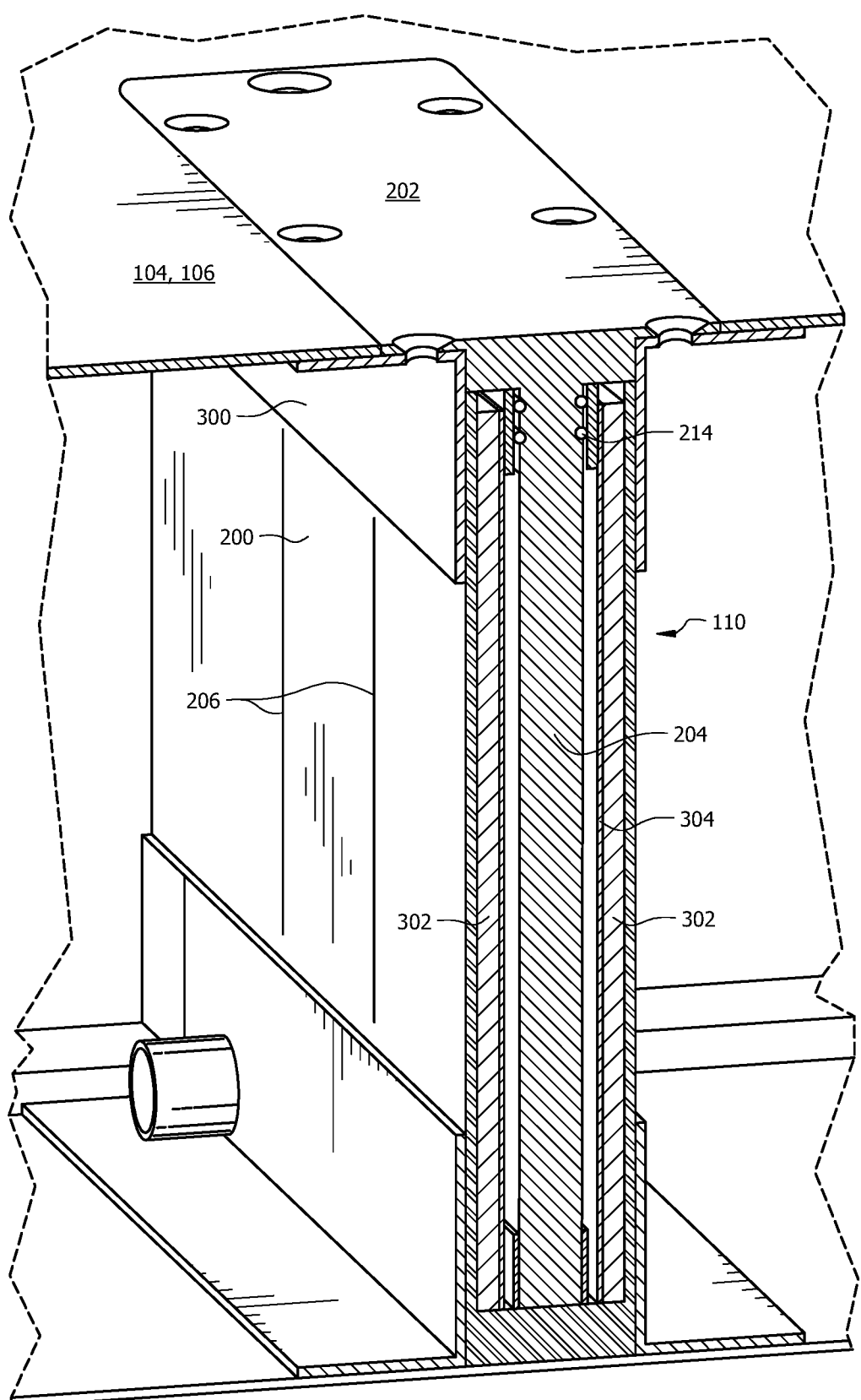
FIGS. 5A and 5B illustrate an example battery, according to certain embodiments.
Figure 5B:
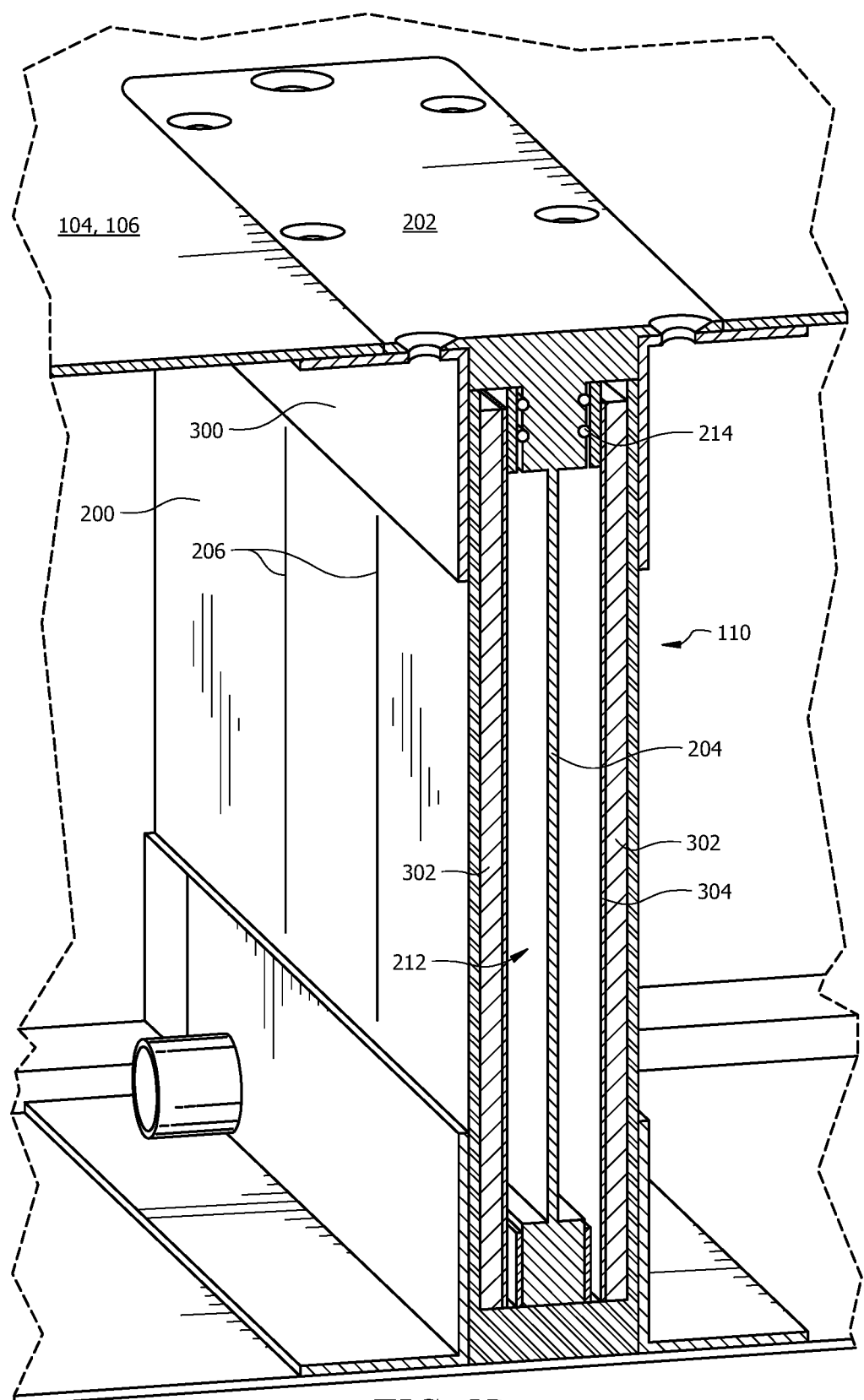

FIGS. 5A and 5B illustrate a cross-sectional view of an example one of the one or more batteries 110 of the second grouping 112 (referring to FIG. 1). The one of the one or more batteries 110 may comprise the housing 200, surface cover 202, anode 204, one or more air vents 206, gap 212 (as illustrated on FIG. 5B), seal 214, flanged cover 300, pair of cathodes 302, and ion exchange membrane separator 304. In embodiments, the housing 200, surface cover 202, one or more air vents 206, gap 212, seal 214, flanged cover 300, pair of cathodes 302, and ion exchange membrane separator 304 may each be operable to function and be arranged similar to the one or more batteries 110 of the first grouping 108 (referring to FIG. 1). In these embodiments, the general shape of the one of the one or more batteries 110 of the second grouping 112 may be rectangular rather than circular. As illustrated, the one of the one or more batteries 110 may be coupled to the first wing 104 or the second wing 106. During operations, the electrolyte may be introduced into the one of the one or more batteries 110 within the gap 212 between the anode 204 and the ion exchange membrane separators 304. Air may be introduced, through the one or more air vents 206, and oxygen from the air may be used in a chemical reaction with the electrolyte, anode 204, and pair of cathodes 302 to produce an electrical charge or power to be utilized by the vehicle 100 (referring to FIG. 1). As a result of the chemical reaction, the anode 204 may corrode. In one or more embodiments, the structural load of the body 102 (referring to FIG. 1), first wing 104, or the second wing 106 may be supported by the anode 204 and pair of cathodes 302. As the anode 204 corrodes during operations, the thickness of the anode 204 may decrease. Despite a decrease in thickness, the anode 204 may continue to provide structural reinforcement as the change in moment of inertia of the anode 204 may be negligible. Without limitations, the thickness of the anode 204 may decrease during corrosion by up to about 90%. An operator may replace the anode 204 when the thickness has decreased by a pre-determined amount with another anode 204, and the battery 110 may continue to produce power for the vehicle 100. The expended anode 204 may be removed from an exterior position from the vehicle 100 (from the top, bottom, or side) and replaced with a new anode 204.

The present disclosure may provide numerous advantages, such as the various technical advantages that have been described with respective to various embodiments and examples disclosed herein. Other technical advantages will be readily apparent to one skilled in the art from the following figures, descriptions, and claims. Moreover, while specific advantages have been enumerated in this disclosure, various embodiments may include all, some, or none of the enumerated advantages.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A battery comprising:
    a top portion comprising:
        a surface cover;
        a first half of a housing coupled to the surface cover and comprising one or more air vents; and
        an anode disposed at least partially within the first half of the housing; and
    a bottom portion comprising:
        a second half of the housing comprising one or more air vents, wherein the anode extends from the first half of the housing and into the second half of the housing; and
        a pair of cathodes disposed at least partially within the second half of the housing, wherein the pair of cathodes extends from the second half of the housing and into the first half of the housing;

wherein:
the top portion is disposed adjacent to and on top of the bottom portion;
the first half of the housing is disposed adjacent to and on top of the second half of the housing;
the first half of the housing and the second half of the housing are configured to support a structural load;
the anode is disposed between the pair of cathodes; and
a gap exists between the anode and each one of the pair of cathodes.

2. The battery of claim 1, further comprising a seal disposed on each side of the anode, wherein each seal is operable to seal the anode to one of the pair of cathodes.

3. The battery of claim 1, further comprising an ion exchange membrane separator, wherein the ion exchange membrane separator is disposed on an interior side of each one of the pair of cathodes operable to protect each one of the pair of cathodes from electrolyte saturation.

4. The battery of claim 1, further comprising a drain pan disposed within the second half of the housing and beneath the anode.

5. The battery of claim 4, further comprising a drain port coupled to the drain pan and disposed about a bottom surface of the drain pan.

6. The battery of claim 1, further comprising electrical leads disposed on the top portion of the battery, wherein the electrical leads are coupled to the first half of the housing.

7. The battery of claim 1, further comprising a fluid port coupled to the first half of the housing and operable to direct a flow of an electrolyte into the gap between the anode and each one of the pair of cathodes.

8. The battery of claim 1, wherein the anode comprises aluminum or an aluminum alloy, wherein the anode is configured to support a structural load during production of an electrical charge through corrosion of the anode.

9. The battery of claim 1, wherein the anode comprises magnesium or a magnesium alloy, wherein the anode is configured to support a structural load during production of an electrical charge through corrosion of the anode.

10. The battery of claim 1, wherein the pair of cathodes comprises porous nickel foam, nickel mesh, carbon foam, carbon mesh, graphite foam, graphite mesh, and any combination thereof.

11. The battery of claim 1, wherein the pair of cathodes are coated with graphene, manganese dioxide ($MgO_2$), platinum on carbon (PtC), silver manganate nanoplates, and any combination thereof.

12. The battery of claim 1, further comprising an electrolyte disposed within the gap between the anode and each one of the pair of cathodes, wherein the electrolyte is a gel or a solid.

13. A system for providing electrical charge comprising:
one or more batteries, wherein each of the one or more batteries comprises:
a top portion, comprising:
a surface cover;
a first half of a housing coupled to the surface cover and comprising one or more air vents; and
an anode disposed at least partially within the first half of the housing; and
a bottom portion coupled to the top portion, comprising:
a second half of the housing comprising one or more air vents, wherein the anode extends from the first half of the housing and into the second half of the housing; and
a pair of cathodes disposed at least partially within the second half of the housing, wherein the pair of cathodes extends from the second half of the housing and into the first half of the housing.

14. The system of claim 13, further comprising an aircraft vehicle, comprising:
a body;
a first wing coupled to the body; and
a second wing coupled to the body and disposed opposite to the first wing;
wherein a first grouping of the one or more batteries is disposed in the body, and wherein a second grouping of the one or more batteries is disposed in the first wing and the second wing.

15. The system of claim 14, further comprising a reservoir and a pump, wherein both the reservoir and the pump are disposed in the body and fluidically coupled to each of the one or more batteries, wherein the pump is operable to direct a flow of electrolyte from the reservoir to each of the one or more batteries.

16. The system of claim 14, wherein the anode comprises aluminum or an aluminum alloy, wherein the anode is configured to support a structural load of the aircraft vehicle during production of an electrical charge through corrosion of the anode.

17. The system of claim 14, wherein the anode comprises magnesium or a magnesium alloy, wherein the anode is configured to support a structural load of the aircraft vehicle during production of an electrical charge through corrosion of the anode.

18. The system of claim 13, wherein the pair of cathodes comprises porous nickel foam, nickel mesh, carbon foam, carbon mesh, graphite foam, graphite mesh, and any combination thereof.

19. The system of claim 13, wherein the pair of cathodes are coated with graphene, manganese dioxide ($MgO_2$), platinum on carbon (PtC), silver manganate nanoplates, and any combination thereof.

20. The system of claim 13, wherein each of the one or more batteries further comprises:
an ion exchange membrane separator, wherein the ion exchange membrane separator is disposed on an interior side of each one of the pair of cathodes operable to protect each one of the pair of cathodes from electrolyte saturation; and
a seal disposed on each side of the anode, wherein each seal is operable to seal the anode to the ion exchange membrane separator.

* * * * *